US008225346B2

(12) United States Patent
Lemmers (10) Patent No.: US 8,225,346 B2
(45) Date of Patent: Jul. 17, 2012

(54) SYSTEM AND METHOD FOR PROVIDING CONDITIONAL ACCESS TO DATA IN AN MHP OR DCAP BROADCAST SYSTEM (75) Inventor: Arjan Lemmers, Reek (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 568 days.

(21) Appl. No.: 11/994,124

(22) PCT Filed: Jun. 29, 2006

(86) PCT No.: PCT/IB2006/052186
§ 371 (c)(1),
(2), (4) Date: Jul. 2, 2008

(87) PCT Pub. No.: WO2007/004161
PCT Pub. Date: Jan. 11, 2007

(65) Prior Publication Data
US 2009/0119724 A1 May 7, 2009

Related U.S. Application Data (60) Provisional application No. 60/695,667, filed on Jun. 30, 2005.

(51) Int. Cl.
H04N 7/167 (2011.01)
(52) U.S. Cl. ............ 725/31; 725/87; 725/104; 725/132; 725/134; 725/140; 725/142; 725/152; 726/3; 726/28; 726/29

(58) Field of Classification Search .............. 725/25–31, 725/87–104; 380/212, 231, 232; 726/26–28
See application file for complete search history.

(56) References Cited

U.S. PATENT DOCUMENTS

| 2001/0029614 | A1 | 10/2001 | Ohgo |
| 2002/0088007 | A1* | 7/2002 | Shimoji et al. ............... 725/135 |
| 2002/0178441 | A1* | 11/2002 | Hashimoto ..................... 725/11 |
| 2003/0070165 | A1* | 4/2003 | Houldsworth ................. 725/25 |
| 2003/0070172 | A1* | 4/2003 | Matsuzaki et al. ............ 725/87 |

(Continued)

FOREIGN PATENT DOCUMENTS
GB 2388234 A 11/2003
(Continued)

OTHER PUBLICATIONS

Sun Microsystems et al; "JAVA TV API Specification", Internet Citation, Jun. 14, 1999, XP002143725, http//java.sun.com/products/javatv/javatvspec0_9_0.

Primary Examiner — Dominic D Saltarelli
Assistant Examiner — Jason J Chung (57) ABSTRACT A system and method is provided for providing subscribers with conditional access to data receivable across a communications medium in an MHP or OCAP broadcast system (100, 300). The invention can be implemented for use with standard MHP or OCAP receivers, without the need for a backchannel or specialized hardware.

21 Claims, 3 Drawing Sheets

U.S. PATENT DOCUMENTS

| | | | |
|---|---|---|---|
| 2003/0163811 A1* | 8/2003 | Luehrs | 725/25 |
| 2003/0169879 A1* | 9/2003 | Akins et al. | 380/241 |
| 2004/0005900 A1 | 1/2004 | Zilliacus | |
| 2004/0055017 A1* | 3/2004 | Delpuch et al. | 725/110 |
| 2004/0103428 A1* | 5/2004 | Seok et al. | 725/25 |
| 2004/0123333 A1* | 6/2004 | Nakatsuyama | 725/142 |
| 2004/0139023 A1 | 7/2004 | Huang et al. | |
| 2004/0210924 A1 | 10/2004 | Duffield | |
| 2004/0226051 A1 | 11/2004 | Carney et al. | |
| 2005/0028208 A1* | 2/2005 | Ellis et al. | 725/58 |
| 2005/0094809 A1* | 5/2005 | Pedlow et al. | 380/200 |
| 2005/0138667 A1* | 6/2005 | Delpuch | 725/105 |
| 2005/0144634 A1* | 6/2005 | Koo et al. | 725/31 |

FOREIGN PATENT DOCUMENTS

| | | |
|---|---|---|
| WO | 0203727 A1 | 1/2002 |
| WO | WO 03019931 A2 * | 3/2003 |
| WO | 03096699 A | 11/2003 |
| WO | 2004049716 A | 6/2004 |

* cited by examiner

SYSTEM AND METHOD FOR PROVIDING CONDITIONAL ACCESS TO DATA IN AN MHP OR DCAP BROADCAST SYSTEM

The present invention relates to a system and method for providing subscribers with conditional access to data (e.g., premium content) receivable across a communications medium in an MHP or OCAP broadcast system.

Television (TV) programming and other kinds of broadcast services are commonly available to the public via subscription from the respective providers, such as cable and satellite TV service providers. Programming content typically includes local broadcast and cable TV programming, pay-per-view (PPV) programs and additional services including music and interactive television (iTV) programming such as games. To implement appropriate access restrictions on individual customers according to content for which they have paid, the broadcast signals are scrambled or encrypted, and an electronic set top box (STB) with specific descrambling capabilities is supplied by the service providers to each of their customers to allow each customer to access the programming that he/she has paid for in unscrambled form. In the broadcasting art, the selective descrambling of broadcast signals is commonly referred to as conditional access (CA) control and the programming and other services that require such descrambling by the service recipients (e.g., PPV programs) are often referred to as CA services.

To implement conditional access control, different programming content carried by broadcast signals are typically encrypted using different encryption schemes. On the receiver (user) side, an STB is typically equipped with a few slots, each of which can accept a physical card, e.g., a PCM-CIA card or a smart card. Each electronic card enables the STB to descramble or decrypt the contents of a limited number of channels. Thus, by providing the appropriate card(s) in the STBs based on their individual subscriptions, the service providers can control the programming content that each customer is able to access accordingly.

Implementing conditional access control in a system that operates in accordance with the DVB-MHP and OCAP standards is not achievable at the present time due to a number of limitations. First, the receivers utilized with such systems are not required to provide slots which can accept a physical card, e.g., a PCMCIA card or a smart card to carry out conditional access control. As such, a broadcaster cannot deploy a conditional access system without a guarantee that the receivers are properly configured to carry out conditional access control. In addition to not having physical slots for accepting a physical card, MHP receivers do not utilize a unique ID embedded in the receiver hardware for recognition and addressing by a service provider. In a video encryption system (as mentioned above) normally the smartcard provides the unique ID.

Thus, there is a need for a system and method that provides subscribers with conditional access to premium content receivable across a communications medium in an MHP or OCAP broadcast system.

The present invention is directed to a system and method for providing conditional access to premium content receivable across a communications medium in an MHP or OCAP broadcast system. The invention can be implemented for use with standard MHP or OCAP receivers, without the need for a backchannel or specialized hardware.

According to a first aspect of the invention, a system for providing conditional access to premium content receivable across a communications medium in an MHP or OCAP broadcast system includes: a broadcaster arranged to broadcast a DVB transport stream across a communications medium to a plurality of receivers, each receiver being under the control of an end-user (hereinafter viewer) in the broadcast system. Each receiver being arranged to execute an application (i.e., computer code) configured to provide an overview of premium content services made available by the broadcaster, receive requests from a viewer for premium content and unlock premium content included in the DVB transport stream. The broadcaster being further arranged to receive viewer requests for premium content services over the communication medium, verify payment, and modify the DVB transport stream to include triggers and/or other parameters to implement a system and method for providing conditional access to premium content.

According to a second aspect of the invention, in lieu of having a dedicated backchannel in an MHP or OCAP broadcast system, the invention utilizes a 'return' channel to exchange certain information between the broadcaster and the plurality of receivers. The 'return' channel can be implemented as either a direct 'return' channel or as an 'indirect' return channel. Particular embodiments of an indirect return channel contemplated by the invention include, without limitation, a wireless communication medium configured to transmit SMS messages, at least one web page accessible by a viewer, and a helpdesk. Note that for each of the aforementioned embodiments, some degree of operator intervention is necessary. Particular embodiments of a direct return channel contemplated by the invention include, without limitation, a modem and a broadband modem. In contrast to the indirect return channel embodiments, no operator intervention is necessary for the direct return channel embodiments.

According to a third aspect of the invention, there is provided a method for providing conditional access to premium content receivable across a communications medium in an MHP or OCAP broadcast system, includes the acts of: making a subscription request from a viewer to access premium content at the viewer's receiver, generating a viewer identification parameter at the viewer's receiver in response to the viewer subscription request, storing the viewer identification parameter at the viewer's receiver, transmitting the viewer identification parameter and the viewer subscription request from the viewer's receiver to a broadcaster over a return channel, re-transmitting the viewer identification parameter from the broadcaster in a DVB transport stream to substantially all receivers in the broadcast system, receiving the DVB transport stream at the viewer's receiver, and unlocking the requested premium content from the transmitted DVB transport stream at the viewer's receiver using the re-transmitted viewer identification parameter and the stored viewer identification parameter.

According to a fourth aspect, the viewer identification parameter may be generated on the broadcaster side or on the receiver side. Particular embodiments of the viewer identification parameter being generated on the receiver side include: generating the viewer identification parameter as a random number at the viewer's receiver, and using a viewer's mobile phone number as the viewer identification parameter to be transmitted as part of an SMS message from the viewer's receiver to the broadcaster. In an embodiment in which the viewer identification parameter is generated as a random number at the viewer's receiver, the viewer identification parameter is not guaranteed to be unique because there is a small probability that at least two viewer receiver's may generate the identical random number.

According to a fifth aspect of the invention, the premium content may be unlocked (i.e., made available for viewing) for different time durations or periods in alternative embodiments. For example, in one embodiment, the premium content is made available to the viewer for a single viewing session (i.e., one-time viewing). In a further embodiment, the premium content is made available for a prescribed time (e.g., one hour, or 7 days). In yet another embodiment, the premium content may be made available for as long as payment for the premium content is maintained by the viewer.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Although the following detailed description contains many specifics for the purpose of illustration, one of ordinary skill in the art will appreciate that many variations and alterations to the following description are within the scope of the invention. Accordingly, the following preferred embodiment of the invention is set forth without any loss of generality to, and without imposing limitations upon, the claimed invention.

One inventive principle of the present invention is the ability to address specific viewers participating in a subscription based data service (e.g., a service providing premium content) in an MHP (or OCAP) broadcast system, without a dedicated backchannel. The ability to address specific viewers without a dedicated backchannel provides advantages over the prior art because maintaining a dedicated backchannel between the plurality of receivers of the broadcast system and the broadcaster is not practical for a number of reasons including, for example, the broadcaster having a limited number of socket connections to accommodate receivers in the broadcast system, the hardware configuration for both the broadcaster and the receivers being more complex in a dedicated backchannel configuration and not all receivers are equipped with a modem connection for implementing a dedicated backchannel. Further, for those receivers that are equipped with a modem capability, the viewer often chooses not to connect the modem to the broadcast system.

Figure 1:
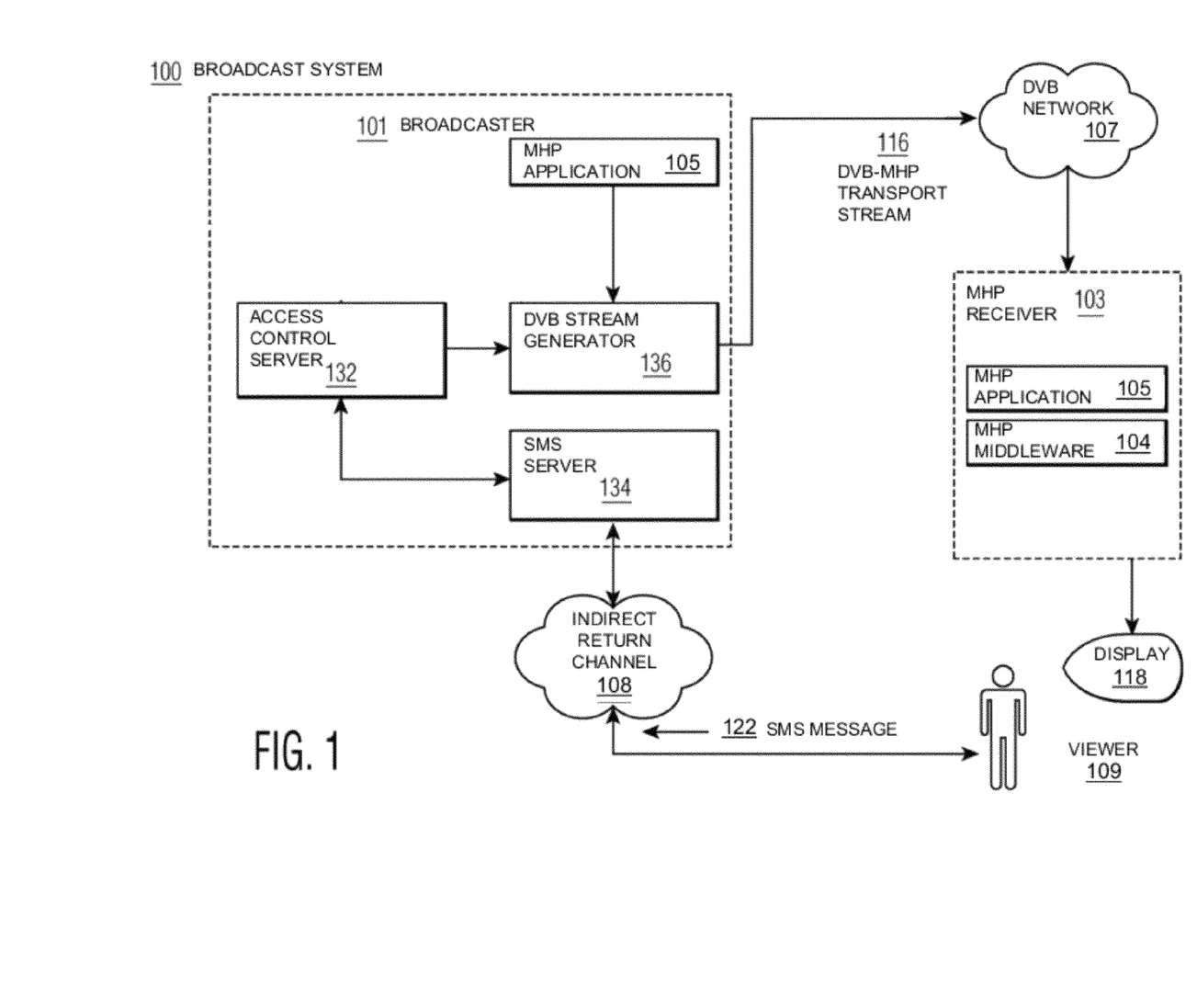
FIG. 1 is an overview of an MHP broadcast system according to an embodiment of the present invention.

FIG. 1 is an overview of a broadcast system 100 according to an embodiment of the present invention. The broadcast system 100 operates in accordance with the MHP broadcast protocol. It should be noted that the system and method of the invention is equally applicable to the OCAP standard which is the interactive TV standard for US cable networks, which is related to MHP, but is based on ATSC instead of DVB.

The broadcast system 100 of FIG. 1 includes a broadcaster 101 configured to broadcast a DVB-MHP transport stream 116 over a unidirectional DVB broadcast network 107 to a plurality of MHP receivers, one of which is shown for ease of explanation, i.e., MHP receiver 103. The MHP receiver 103 includes MHP middleware 104 configured to run an MHP application 105 programmed to execute features of the invention.

In operation, the MHP application 105, which may be downloaded from the broadcaster 101 or may be resident within the MHP receiver 103, displays a list of currently available premium content to the viewer 109 on a display device 118. From the display, the viewer 109 makes a request to subscribe to premium content from the list. In response to the viewer request, the MHP application 105 initiates an 'unlock' procedure. The 'unlock' procedure generates a viewer identification parameter in response to the viewer request for premium content. The viewer identification parameter is preferably generated as a random number by a random number generator (not shown) at the MHP receiver 103.

The 'unlock' procedure then prompts the viewer 109 on the display device 118 to send a short message service (SMS) 144 including the viewer identification parameter over an indirect 'return' channel 108 to the broadcaster 101. For example, the viewer 109 may be shown a prompt on the display device 118 stating: "Please send an SMS message to number 06.12.14.56.59 with message content '1234567890'", where '1234567890' represents the viewer identification parameter generated by the MHP application 105.

Substantially coincident with executing the 'unlock' procedure, the MHP application 105 executes a second procedure, referred to herein as a 'filter' procedure. The 'filter' procedure is programmed to detect an 'unlock' trigger, transmitted as part of a DVB-MHP transport stream 116 from the broadcaster 101 to substantially all MHP receivers in the broadcast system including the MHP receiver 103 associated with one of the viewers making a request for premium content.

Prior to the 'filter' and 'unlock' procedures performing their respective functions at the viewer's MHP receiver 103, a number of steps must occur first at the broadcaster 101. They are described as follows.

As stated above, an SMS message 122 is transmitted from the viewer 109 to the broadcaster 101, as managed by the 'unlock' procedure running at the viewer's receiver 103. At the broadcaster 101, the SMS message 122 is received by the SMS server 134 via a return channel 108. The SMS message 122 is forwarded from the SMS server 134 to an access control server 132. The access control server 132 verifies that the viewer is allowed to view the premium content. This may be determined, in one way, via payment a payment verification process. One way to verify that payment has been received from the viewer 109 is to embed the mobile phone number of the requesting viewer 109, as the viewer identification parameter in the SMS message 122. The access control server 132 can then use the mobile phone number of the viewer to identify the viewer's payment account.

Subsequent to receiving the viewer identification parameter and performing a of viewer approval process, the broadcaster 101 creates an 'unlock' trigger which includes the viewer identification parameter transmitted from the viewer 109 over return channel 108. The 'unlock' trigger is multiplexed into the DVB-MHP transport stream 116 as a DSM-CC stream event for a time duration of 5 seconds at a minimum. The maximum time duration is preferably on the order of 30 seconds. In another embodiment, instead of using a DSM-CC stream event, the 'unlock' trigger can be placed in one or more DSM-CC files to allow the 'unlock' procedure, running at the MHP receiver 103, sufficient time to filter the DVB transport stream 116 to extract the 'unlock' trigger. In yet another embodiment, the 'unlock' trigger can be placed in DVB sections.

All of the premium content that may potentially be requested by a viewer is multiplexed in a DVB-MHP transport stream 116 by the MHP carousel generator 136 in a carousel file-system and transmitted on a continuous basis as part of a 'service' in the DVB-MHP transport stream 116, where a service is defined as a set of elementary streams of various types which are intended to be presented to the user as a whole. In addition, the MHP application 105 is multiplexed in the DVB-MHP transport stream 116 by the MHP carousel generator 136 for continuous transmission as part of the DVB-MHP transport stream 116.

The DVB-MHP transport stream 116 is modified to include the 'unlock' trigger and is broadcast to substantially all MHP receivers in the network including the MHP receiver 103 making a request for premium content in the present illustrative example.

Recall from above that two procedures were executed at the MHP receiver 103 associated with the viewer request at a point in time substantially coincident with the viewer making his or her request, namely, the 'filter' procedure and 'unlock' procedure. Both procedures actively run under control of the MHP receiver 103.

The 'filter' procedure is programmed to 'filter' the transmitted DVB transport stream 116 to detect the presence of 'unlock' triggers which are transmitted as part of the DVB transport stream 116. It should be appreciated that while the present discussion highlights the request from a single viewer 109, corresponding to a single 'unlock' trigger, in actuality, multiple viewers may be making requests for different premium content at substantially the same time. In this case, the transmitted DVB transport stream 116 includes an 'unlock' trigger for each viewer request.

Subsequent to the 'unlock' procedure detecting a particular 'unlock' trigger in the DVB transport stream 116, the 'unlock' procedure then extracts the viewer identification parameter embedded within the detected 'unlock' trigger to attempt to unlock the premium content requested by the viewer 109. Unlocking the premium content can be successful or unsuccessful dependent upon whether a comparison of the embedded viewer identification parameter in the detected 'unlock' trigger matches the viewer identification parameter stored locally in a volatile memory (not shown) of the MHP receiver 103. When the comparison results in a match, the 'unlock' procedure successfully unlocks the premium content from the modified DVB transport signal 116. At this point, the 'unlock' procedure is finished.

It is therefore shown that by passing the viewer identification parameter from a viewer's receiver to the broadcaster over the return channel, the broadcaster is capable, at a later point in time, of using the viewer identification parameter in a DVB broadcast stream, broadcast to substantially all viewers, to specifically target the requesting viewer's receiver to deliver the requested premium content. It should be appreciated that this process is implemented without the use of a dedicated backchannel.

Figure 2:
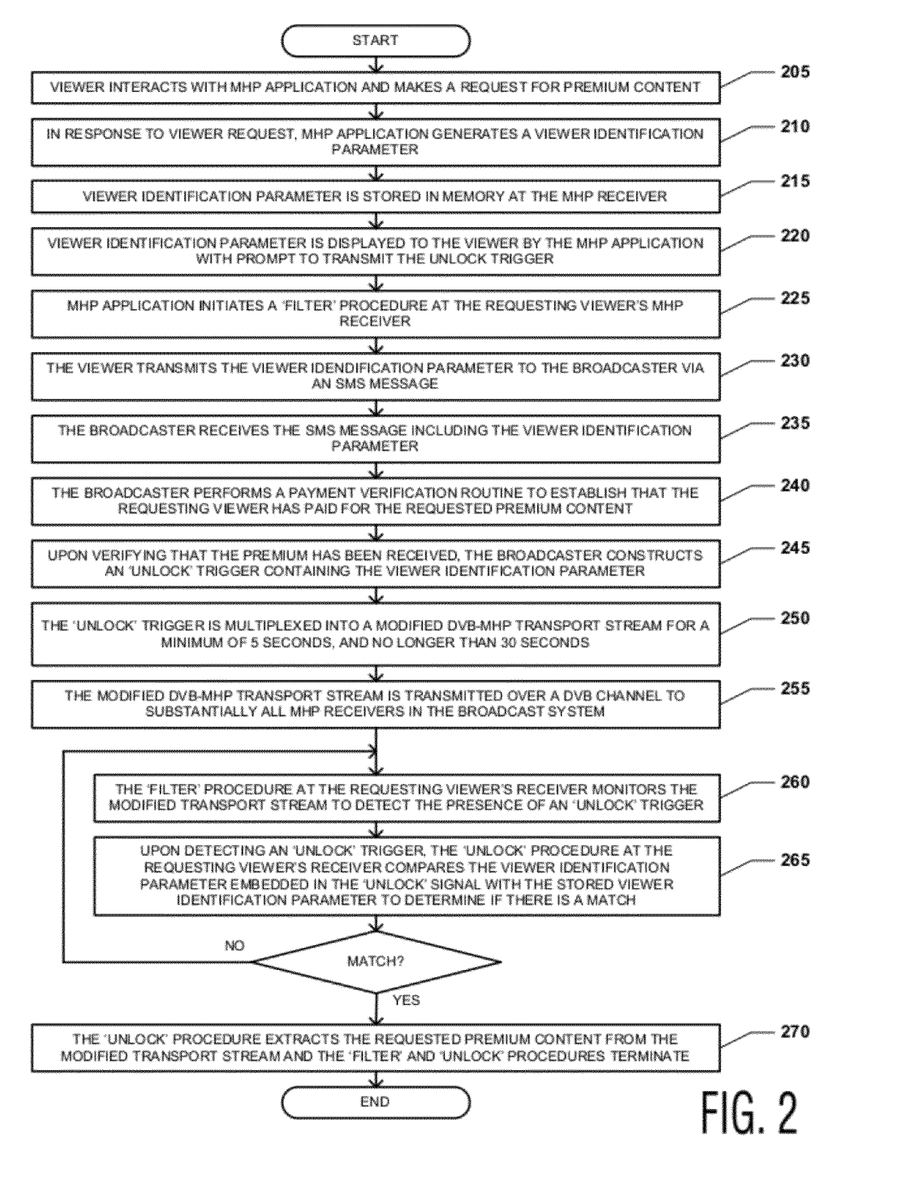
FIG. 2 is a flow chart of a method for providing conditional access to premium content receivable across a communications medium in an MHP or OCAP broadcast system.

Referring now to FIG. 2, there is shown an overview of operational steps in flow diagram form, of a method for providing conditional access to premium content receivable across a communications medium in an MHP or OCAP broadcast system, the method comprising the acts of:

At activity 205, a viewer 109 interacts with an MHP application 105 and makes a subscription request for premium content.

At activity 210, in response to the viewer request for premium content, the MHP application 105 generates a viewer identification parameter.

At activity 215, the viewer identification parameter is stored in a volatile memory at the MHP receiver 103.

At activity 220, the viewer identification parameter is displayed to the viewer 109 by the MHP application 105 and prompts the viewer 109 to transmit the unlock trigger to the broadcaster 101.

At activity 225, the MHP application 105 at the requesting viewer's MHP receiver 103 initiates a 'filter' procedure.

At activity 230, the viewer 109 transmits the viewer identification parameter to the broadcaster 101, via an SMS message 122.

At activity 235, the broadcaster 101 receives the SMS message 122 including the viewer identification parameter.

At activity 240, the broadcaster 101 performs a payment verification routine to establish that the requesting viewer has paid for the requested premium content.

At activity 245, upon verifying that payment has been received, the broadcaster 101 constructs an 'unlock' trigger containing the viewer identification parameter.

At activity 250, the 'unlock' trigger is multiplexed into a modified DVB-MHP transport stream 116 for a minimum of 5 seconds and preferably for no longer than substantially 30 seconds.

At activity 255, the modified DVB-MHP transport stream 116 is transmitted over a DVB channel to substantially all MHP receivers in the broadcast system 100 including MHP receiver 103.

At activity 260, the 'filter' procedure initiated at act 225, monitors the modified DVB-MHP transport stream 116 to detect the presence of an 'unlock' trigger.

At activity 265, upon detecting an unlock trigger, the 'unlock' procedure compares the viewer identification parameter embedded in the 'unlock' signal with the viewer identification parameter stored at the MHP receiver 103 at act 215 to determine if there is a match. If it is determined that there is no match at activity 265, the process continues at activity 260.

At activity 270, if it is determined that there is a match at activity 265, then the 'unlock' procedure extracts the requested premium content from the modified DVB-MHP transport stream 116 and the 'filter' and 'unlock' procedures are terminated.

According to an aspect of the present invention, the premium content may be unlocked (i.e., made available for viewing) for different time periods.

In one embodiment, the premium content is made available to the viewer for a single viewing session (i.e., one-time viewing). In this embodiment, the MHP application 105 running at the viewer's receiver is configured to unlock the requested premium content from the DVB transport stream for a single access (one-time viewing). Single access viewing may be hard coded into the MHP application 105 as a system configuration parameter. Alternatively, the MHP application 105 may be implemented in such a way as to only support single access viewing. The MHP application 105 may be coded to perform single access viewing in the case where it does not detect any additional triggers in the DVB broadcast stream.

In a further embodiment, the viewing period is a prescribed time (e.g., 1 hour, 7 days, etc.). In this embodiment, the unlock trigger includes two parameters, the viewer identification parameter, as described above and a duration parameter which defines the prescribed time over which the premium content will remain unlocked. The duration parameter is preferably stored in a resident memory of the viewer's receiver. Alternatively, an end-time parameter may be used instead of a duration parameter to define the point in time at which the premium content will be relocked (e.g., Jul. 7, 2005@3 pm). It is assumed that the start time for viewing the requested premium content is substantially coincident with the point in time of the viewer's request.

In yet a further embodiment, the premium content remains unlocked as long as the viewer maintains payment for the premium service. In this embodiment, the unlock trigger, included in the DVB transport stream 116, includes two parameters, the viewer identification parameter, as described above, and a re-lock identification parameter. The re-lock identification parameter is used to re-lock the premium content when it is determined by the broadcaster that payment is no longer being maintained by the viewer. The re-lock identification parameter is preferably stored in a resident memory of the receiver.

One technique for re-locking the premium content using the re-lock identification parameter is for the broadcaster to continuously transmit a 're-lock' file comprised of a list of re-lock identification parameters corresponding to viewers who have discontinued payment for their premium service. Each time the viewer accesses the premium content, an application resident at the viewer's receiver analyzes the transmitted re-lock file to determine if it includes a re-lock identification parameter corresponding to the viewer's receiver. When a match is found, the application re-locks the premium content making it unavailable to the viewer by removing the re-lock user identification parameter from the resident memory. Another technique for re-locking the premium content is to transmit an 'access' file comprised of a list of re-lock identification parameters corresponding to viewers who are currently being granted access to the premium content.

The 'access' file is comprised of a list of re-lock identification parameters corresponding to viewers who are currently being granted access to the premium content. The application 105 analyzes the transmitted 'access' file to determine if it includes a re-lock identification parameter corresponding to the viewer's receiver. When the application identifies a re-lock identification parameter corresponding to the viewer, the application takes no action and maintains viewer access to the premium content. Otherwise, in the case where the 'access' file does not include the viewer's re-lock identification parameter, the MHP application 105 re-locks the premium content at the viewer's receiver 105 making it unavailable to the viewer 109.

Figure 3:
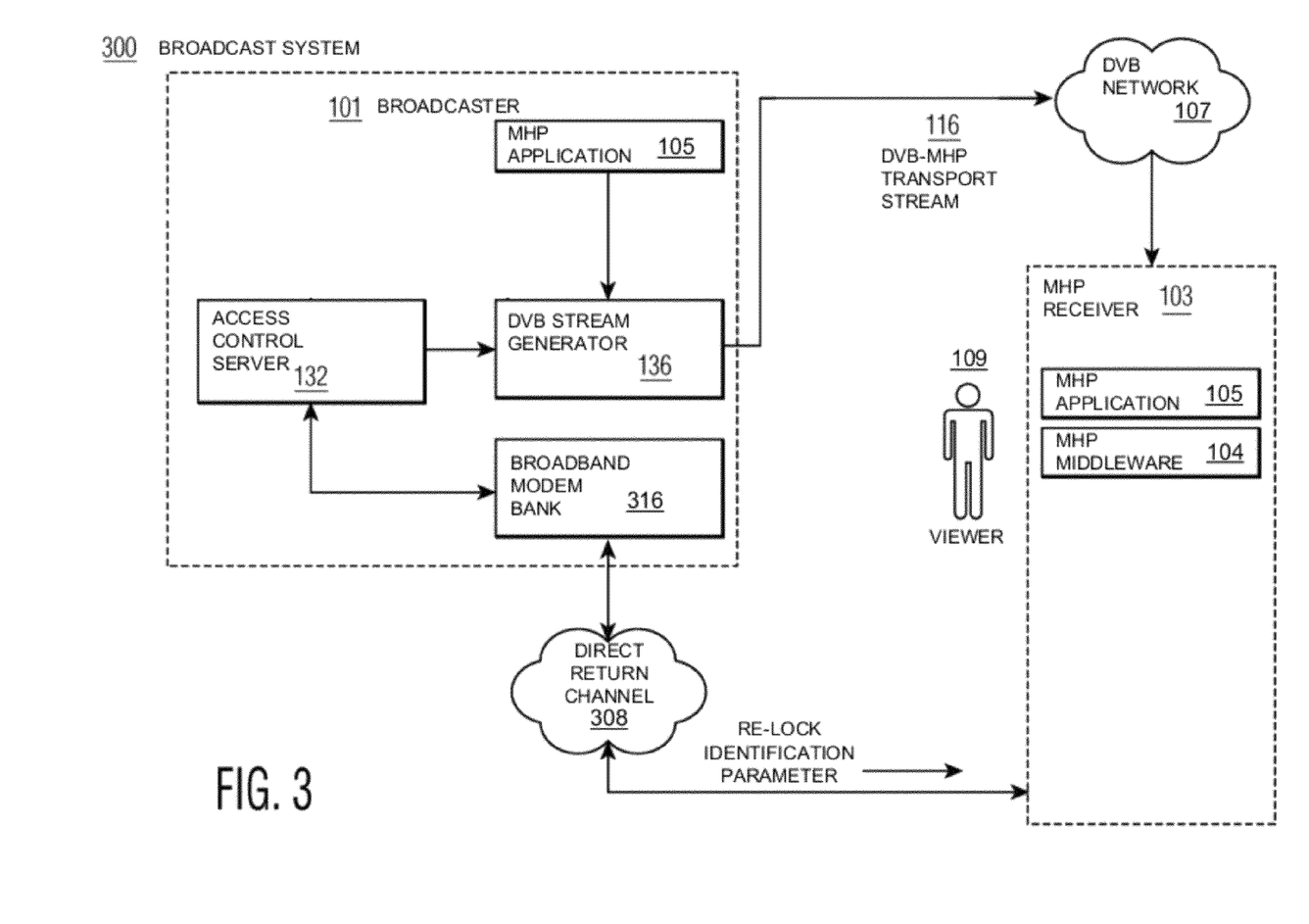
FIG. 3 is an overview of an MHP broadcast system according to an embodiment of the present invention.

In a second embodiment, as illustrated in FIG. 3, the broadcast system 300 is substantially identical to the broadcast system 100 of FIG. 1 except that in the present embodiment a direct backchannel 308 is used instead of the indirect 'return' channel 108, and a modem bank 316 interface is used instead of the SMS interface 134 illustrated in the embodiment of FIG. 1.

In the previously described embodiment, as illustrated in FIG. 1, the viewer identification parameter was generated on the receiver side and transmitted as an SMS message to the broadcaster over the indirect 'return' channel 108. Thereafter, the viewer identification parameter was multiplexed into a modified DVB-MHP transport stream 116 to provide a mechanism to allow an application on the receiver side to unlock the premium content.

In the present embodiment, premium content is unlocked via the direct backchannel 308 established between the broadcaster 101 and a viewer's receiver 103. As such, there is no need to transmit a viewer identification parameter from the viewer's receiver 103 to the broadcaster 101 to unlock the requested premium content, as disclosed in the previous embodiment illustrated in FIG. 1.

To relock the premium content, the broadcaster 101 transmits a re-lock identification parameter to the viewer's receiver 103 and then closes the direct backchannel 308. The re-lock identification parameter is described above.

At a point in time when the broadcaster 101 determines that the viewer is either no longer paying for the requested premium content or has terminated the service, the broadcaster 101 re-locks the requested premium content by including the viewer's re-lock identification parameter in a 're-lock' file, as described above. In another embodiment, the broadcaster 101 can re-lock the requested premium content by transmitting an 'access' file. As described above, the 'access' file is comprised of a list of re-lock identification parameters corresponding to viewers who are currently being granted access to the premium content. The MHP application 105 analyzes the transmitted 'access' file to determine if it includes a re-lock identification parameter corresponding to the viewer's receiver. When the application identifies a re-lock identification parameter corresponding to the viewer, the application takes no action and maintains viewer access to the premium content. Otherwise, in the case where the 'access' file does not include the viewer's re-lock identification parameter, the MHP application 105 re-locks the premium content at the viewer's receiver 105 making it unavailable to the viewer 109.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A method for providing conditional access to premium content receivable across a communications medium in one of an MHP and an OCAP broadcast system, including the acts of:

(a) making a subscription request from a viewer via a multimedia home platform (MHP) receiver to access the premium content at the viewer's receiver;

(b) generating, via an unlock procedure initiated by an MHP application that is executed within the viewer's receiver in response to the viewer's subscription request, a viewer identification parameter at the viewer's receiver in response to the viewer subscription request, wherein the MHP receiver of the viewer does not utilize a unique ID embedded in the receiver hardware for recognition and addressing by a service provider;

(c) storing the viewer identification parameter in a volatile memory at the viewer's receiver;

(d) transmitting in response to a prompt by the unlock procedure of the MHP application (d)(1) the viewer identification parameter and (d)(2) the viewer subscription request to a broadcaster over a return channel;

(e) authorizing, at the broadcaster, viewer access to the premium content;

(f) re-transmitting, in response to viewer access being authorized, the viewer identification parameter that was (f)(i) generated at the viewer's receiver, (f)(ii) transmitted to the broadcaster over the return channel, and (f)(iii) received by the broadcaster over the return channel, wherein re-transmitting includes re-transmitting the viewer identification parameter within an unlock trigger from the broadcaster in a modified transport stream that is broadcast to substantially all receivers in the broadcast system, including the viewer's MHP receiver;

(g) receiving the transport stream with the re-transmitted viewer identification parameter at the viewer's receiver, wherein the transport stream is monitored at the viewer's receiver via a filter procedure executed by the MHP application substantially coincident with executing the unlock procedure, the filter procedure being programmed to detect a presence of unlock triggers transmitted as part of the modified transport stream, wherein responsive to the filter procedure detecting a particular unlock trigger, the unlock procedure extracts the re-transmitted viewer identification parameter from within the detected unlock trigger to attempt to unlock the premium content requested by the viewer; and (h) unlocking the requested premium content from the transmitted transport stream at the viewer's receiver in response to (h)(1) the re-transmitted viewer identification parameter and (h)(2) the viewer identification parameter stored in the volatile memory of the viewer's receiver matching at the viewer's receiver.

2. The method of claim 1, wherein further comprising the acts of:
(i) embedding the viewer identification parameter into an unlock trigger at the broadcaster; and
(ii) multiplexing the unlock trigger into a transmitted DVB transport stream at the broadcaster.

3. The method of claim 2, wherein the unlock trigger is multiplexed into the transmitted DVB transport stream at the broadcaster as a DSMCC stream event for a minimum time duration of five seconds.

4. The method of claim 3, wherein the unlock trigger is multiplexed into the transmitted DVB transport stream at the broadcaster as a DVB section.

5. The method of claim 2, wherein the unlock trigger is multiplexed into the transmitted DVB transport stream at the broadcaster as one or more DSMCC files.

6. The method of claim 2, wherein said act (h) further comprises the acts of:
(i) detecting the unlock trigger from the received DVB transport stream at the viewer's receiver;
(ii) extracting the viewer identification parameter from the detected unlock trigger;
(iii) comparing the extracted viewer identification parameter with the viewer identification parameter stored at the viewer's receiver at said act (c) to determine if there is a match; and
(iv) unlocking the requested premium content from the transmitted DVB transport stream at the viewer's receiver responsive to said comparison resulting in a match at said act (iii).

7. The method of claim 2, further comprising the acts of:
embedding a duration parameter into the unlock trigger at the broadcaster; and
subsequent to said premium content being unlocked at said act (g), re-locking the unlocked requested premium content after a period of time defined by the duration parameter.

8. The method of claim 2, further comprising the acts of:
embedding an end-time parameter into the unlock trigger at the broadcaster; and
subsequent to said premium content being unlocked at said act (g), re-locking the unlocked requested premium content after a period of time defined by the end-time parameter.

9. The method of claim 1, further comprising the acts of:
generating a re-lock identification parameter at the broadcaster; and
transmitting the re-lock identification parameter from the broadcaster to the viewer's receiver over the return channel.

10. The method of claim 9, further comprising the acts of:
determining at the broadcaster that the viewer should be denied access to the premium content;
including the re-lock identification parameter in a re-lock file at the broadcaster, responsive to said determination;
broadcasting the re-lock file from said broadcaster in the transmitted transport stream;
identifying the re-lock identification parameter from said re-lock file at said viewer's receiver; and
re-locking the premium content at said viewer's receiver responsive to said identification.

11. The method of claim 10, wherein said re-lock file is continuously broadcast from the broadcaster in the transmitted transport stream.

12. The method of claim 9, further comprising the acts of:
determining at the broadcaster that the viewer is allowed access to the premium content;
including the re-lock identification parameter in an access file responsive to said determination;
broadcasting the access file from said broadcaster in the transmitted transport stream;
identifying the re-lock identification parameter from said access file at said viewer's receiver; and
allowing the viewer to maintain access to the premium content at said viewer's receiver responsive to said identification.

13. The method of claim 12, wherein said access file is continuously broadcast from the broadcaster in the transmitted transport stream.

14. The method of claim 13, further comprising denying the viewer access to the premium content at said viewer's receiver if the re-lock identification parameter is not identified at said viewer's receiver.

15. The method of claim 1, wherein said act (b) of generating a viewer identification parameter in response to the viewer request comprises generating a random number at the viewer's receiver.

16. The method of claim 1, wherein said act (d) further comprises the acts of:
(i) constructing an SMS message including the viewer identification parameter and the viewer request; and
(ii) transmitting the SMS message from the viewer's receiver to the broadcaster over the return channel.

17. The method of claim 1, wherein the viewer identification parameter is a phone number.

18. The method of claim 1, wherein the return channel is an indirect return channel.

19. The method of claim 18, where the indirect channel is selected from the group consisting of (1) an SMS channel, (2) a channel utilizing a world wide web interface, and (3) a helpdesk.

20. A system for providing conditional access to premium content receivable across a communications medium in an MHP or OCAP broadcast system, the system comprising:

a broadcaster arranged to:
  receive requests for premium content and viewer identification parameters from at least one receiver of a viewer in said broadcast system, wherein the viewer identification parameters are generated via an unlock procedure initiated by an MHP application that is executed at a respective receiver in response to a viewer's subscription request for premium content, wherein the receiver of the viewer does not utilize a unique ID embedded in the receiver hardware for recognition and addressing by a service provider;
  multiplex in a transport stream for transmission to substantially all receivers in said broadcast system:
    (i) the premium content,
    (ii) an application programmed to manage operations associated with the management of providing conditional access to said premium content at one or more receivers in said broadcast system, and
    (iii) triggers and or other parameters utilized by said application to manage said operations, wherein the other parameters include a re-transmitted viewer identification parameter of the requesting at least one viewer's receiver, wherein the re-transmitted viewer identification parameter comprises a viewer identification parameter that was (iii)(a) generated at the at least one viewer's receiver, (iii)(b) transmitted to the broadcaster over a return channel, and (iii)(c) received by the broadcaster over the return channel, and
  broadcast a modified transport stream with the re-transmitted viewer identification parameter within an unlock trigger to substantially all receivers in the broadcast system, wherein responsive to receiving the modified transport stream at the viewer's receiver, the modified transport stream is monitored at the viewer's receiver via a filter procedure executed by the MHP application that is executed at a respective receiver in response to a viewer's subscription request for premium content and substantially coincident with executing the unlock procedure, the filter procedure being programmed to detect a presence of unlock triggers transmitted as part of the modified transport stream, wherein responsive to the filter procedure detecting a particular unlock trigger, the unlock procedure extracts the re-transmitted viewer identification parameter from within the detected unlock trigger to attempt to unlock the premium content requested by the viewer, and wherein the requested premium content from the transmitted transport stream is unlocked at the viewer's receiver in response to the re-transmitted viewer identification parameter and a viewer identification parameter stored in volatile memory of the viewer's receiver matching at the viewer's receiver.

21. A non-transitory computer-readable medium embodied with processing instructions executable by a computer for implementing a method for providing conditional access to premium content receivable by a viewer's receiver across a communications medium in an MHP or OCAP broadcast system from a broadcaster, the method including the acts of: verifying at the broadcaster that at least one viewer is permitted to access the premium content, displaying a list of premium content at the viewer's receiver to said viewer, generating a viewer identification parameter at the viewer's receiver, wherein the viewer identification parameter is generated via an unlock procedure initiated by an MHP application that is executed at a respective receiver in response to a viewer's subscription request for premium content, storing the viewer identification parameter in a volatile memory at the viewer's receiver, prompting the viewer at the viewer's receiver to transmit the viewer identification parameter to the broadcaster over a return channel, wherein the receiver of the viewer does not utilize a unique ID embedded in the receiver hardware for recognition and addressing by a service provider, identifying at the viewer's receiver triggers and/or other parameters broadcasted as part of a transport stream broadcasted from said broadcaster, wherein the other parameters include a re-transmitted viewer identification parameter of the requesting at least one viewer's receiver embedded within an unlock trigger, wherein the re-transmitted viewer identification parameter comprises a viewer identification parameter that was (iii)(a) generated at the viewer's receiver, (iii)(b) transmitted to the broadcaster over the return channel, and (iii)(c) received by the broadcaster over the return channel, and utilizing said triggers and/or other parameters broadcasted as part of the transport stream broadcasted from said broadcaster to provide said conditional access at the viewer's receiver, wherein the transport stream is monitored at the viewer's receiver via a filter procedure executed by the MHP application substantially coincident with executing the unlock procedure, the filter procedure being programmed to detect a presence of unlock triggers transmitted as part of the transport stream, wherein responsive to the filter procedure detecting a particular unlock trigger, the unlock procedure extracts the re-transmitted viewer identification parameter from within the detected unlock trigger to attempt to unlock the premium content requested by the viewer, and wherein the requested premium content from the transmitted transport stream is unlocked at the viewer's receiver in response to the re-transmitted viewer identification parameter and the viewer identification parameter stored in the volatile memory of the viewer's receiver matching at the viewer's receiver.

* * * * *